June 29, 1937.  R. E. STURM ET AL  2,085,344

TESTING APPARATUS AND METHOD OF TESTING

Filed Dec. 16, 1935  2 Sheets-Sheet 2

INVENTOR
Ralph E. Sturm
Herman L. Hartzell
BY
ATTORNEYS

Patented June 29, 1937

2,085,344

UNITED STATES PATENT OFFICE 2,085,344

TESTING APPARATUS AND METHOD OF TESTING

Ralph E. Sturm, Detroit, Mich., and Herman L. Hartzell, Anderson, Ind., assignors to General Motors Corporation, Detroit, Mich., a corporation of Delaware Application December 16, 1935, Serial No. 54,594

7 Claims. (Cl. 175—183)

This invention relates to testing apparatus and a method of testing, and more particularly to apparatus and a method for testing coils, transformers and the like, such as those used in ignition systems for internal combustion engines.

An object of this invention is to provide apparatus and a method of testing coils, such as those used in ignition circuits, which effect a dependable determination of the value or condition of the coil tested.

Another object of this invention is to provide apparatus and a method of testing ignition coils and the like, which apparatus and method indicate the presence of short circuited turns, leaky insulation, excessive iron loss, internal breakdown, etc., as well as an open circuit in the coil.

Another object of this invention is to provide a method and apparatus of testing ignition coils and the like that provide for a predetermined heating of the coil and for testing under heated conditions as a part of the complete test of the coil.

Another object of this invention is to provide apparatus for the testing of coils, which apparatus can be adjusted at the time of the test to give accurate determinations under the conditions of the test.

Another object of this invention is to provide a complete coil testing apparatus that will clearly indicate even small defects in coils, and that can be embodied into a compact unit.

Further objects and advantages of the present invention will be apparent from the following description, reference being had to the accompanying drawings, wherein a preferred embodiment of the present invention is clearly shown.

In the disclosed embodiment of this invention, the above stated objects are accomplished by a method of testing which comprehends the steps of intermittently applying a direct current to the coil being tested so that magnetic flux is intermittently built up around the turns of the coil, and obtaining an indication of the condition of the coil by measuring an electrical quantity that is dependent upon the rate of damping of flux oscillations through the turns of the coil when no direct current is being applied to the coil. The method also preferably includes the steps of making such measurements before and after heating the coil.

Also in the disclosed embodiment, the apparatus for accomplishing these objects comprehends a source of direct current, the coil to be tested, a circuit interrupter for periodically connecting the coil to the direct current source, means connected to the coil for effecting a damped oscillatory decay of the flux of the coil during interruptions of the circuit interrupter, and means electrically connected to the coil for measuring an electrical quantity dependent upon the rate of damping of flux oscillations in the coil. It is preferable, as disclosed, to provide means for heating the coil by applying a current thereto for a time sufficient to heat the coil a predetermined amount. It is also preferable, as disclosed, to provide means for adjusting the apparatus at the time of making the tests.

Figure 1:
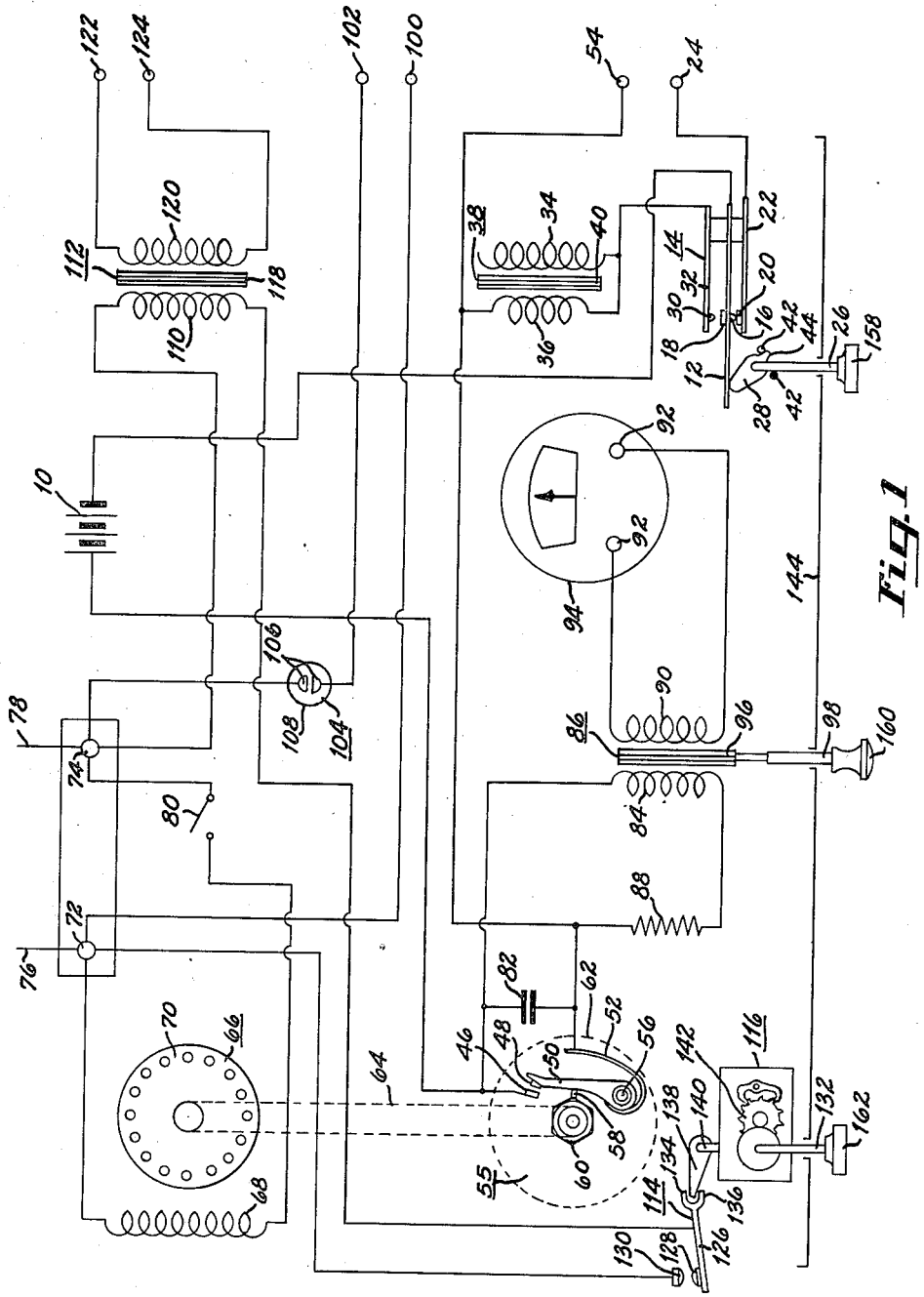
Fig. 1 is a schematic circuit diagram embodying the present invention in a preferred form.
Figure 4:
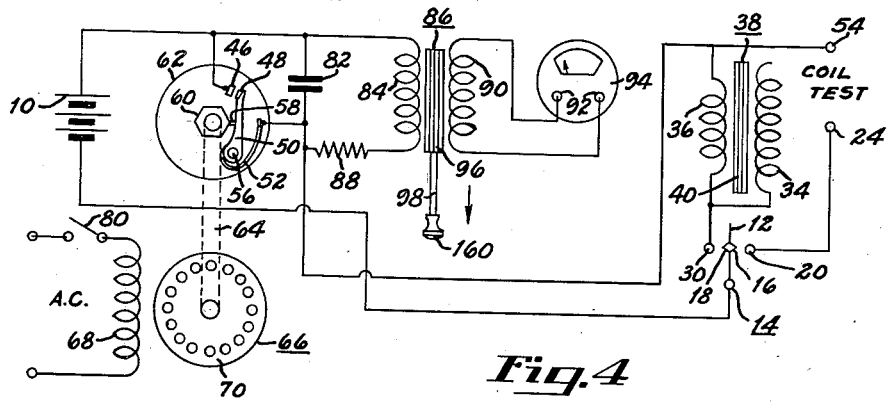
Figures 3, 5:
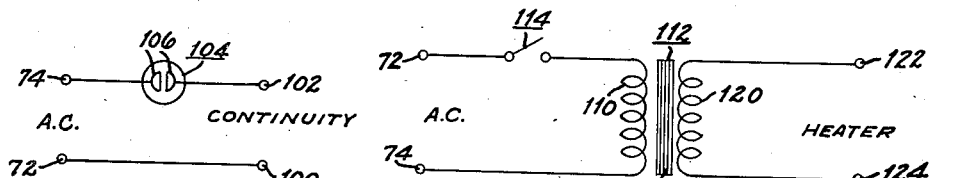

Figs. 3, 4, and 5 are schematic circuit diagrams of separated portions of the circuit shown in Fig. 1.

With particular reference to Fig. 1, a source of direct current, such as a battery 10, preferably has a potential suitable for the proper normal operation of a coil or electrical transforming device that is to be tested. One side of the battery 10 is connected to a movable contact carrying arm 12 of a switch 14, which contact carrying arm has contacts 16 and 18 mounted on opposite sides thereof. The contact carrying arm 12 is preferably resilient, and biases the contact 16 into engagement with a stationary contact 20 that is mounted on a contact carrying arm 22. The contact carrying arm 22 is connected to a terminal or binding post 24. The switch 14 is provided with a manually operable operating member 26 having a cam 28 mounted thereon that engages the contact carrying arm 12 to effect movement of that contact carrying arm and control of the contacts that are mounted thereon. When the contact carrying member 12 is moved by the operating member 26 and cam 28 against the normal biasing force thereof, the contacts 16 and 20 are opened, and the contact 18 engages a stationary contact 30 that is mounted on a contact carrying arm 32. The contact carrying arm 32 is connected to the common ends of a secondary winding 34 and a primary winding 36 of a standard coil 38. The standard coil 38 has a core 40 through which the primary and secondary windings thereof are magnetically coupled. Stop members 42 that cooperate with a projecting portion 44 on the cam 28 are provided for limiting the movement of the operating member 26. The other side of the battery 10 is connected through breaker points 46 and 48, a breaker arm 50 and a spring 52 of a circuit breaker 55 to the other end of the primary winding 36 and to a terminal or binding post 54.

The contact 46 is preferably a stationary contact, and cooperates with the movable contact 48 that is mounted near the end of the breaker arm 50, which breaker arm is pivotally mounted at 56. The spring 52 biases the breaker arm 50 toward the contact 46. A bumper block 58 is secured to the breaker arm intermediate the ends thereof and cooperates with a rotatable cam 60, which cam, when rotated, intermittently and periodically moves the breaker arm against the biasing force of the spring 52 to effect periodic breaking of the contacts 46 and 48. Hence, when the breaker is operated, an intermittent or periodically interrupted potential is normally applied to the terminals or binding posts 24 and 54; or when the contacts 18 and 30 are engaged, to the primary winding 36 of the standard coil 38. The secondary winding 34 of the standard coil 38 is preferably open circuited.

The breaker arm 50, contacts 46 and 48, spring 52 and cam 60 are preferably mounted in a housing as indicated at 62. The cam 60 is preferably mounted on a shaft 64 that is drivingly connected to a driving motor 66, which motor is preferably a substantially constant speed alternating current motor having a field winding 68 and a rotor 70. Terminals 72 and 74 are connected to an alternating current power supply line indicated by the leads 76 and 78. One end of the field winding 68 is connected to the terminal 72, and the other end of the field winding 68 is connected through a switch 80 to the terminal 74, so that the switch 80 controls the operation of the motor 66.

A condenser 82 is connected across the contacts 46 and 48 to limit and reduce sparking at those contacts. One end of a primary winding 84 of a transformer 86 is connected to the contact 46. The other end of the primary winding 84 is connected through a resistor 88, the spring 52 and breaker arm 50 to the contact 48. Thus, the condenser 82 also provides a lump capacity in the primary circuit of the coil that is connected thereto, which condenser and primary winding form an oscillatory circuit. The transformer 86 has a secondary winding 90 that is connected across the terminals 92 of a meter or indicating device 94. The transformer 86 also has a core 96 through which the windings 84 and 90 are magnetically coupled. The core 96 is preferably movable, as by sliding for varying the magnetic coupling between the windings 84 and 90. A manually movable actuating member 98 is secured to the core 96 for adjusting the transformer coupling.

To provide a continuity test circuit, the terminal 72 is connected to a terminal or binding post 100; and the terminal 74 is connected to a terminal or binding post 102 through an indicating device 104 that is preferably a gaseous discharge tube having electrodes 106 sealed into a glass container 108.

Since it is desirable to test some coils when they are heated, as well as when they are cold, it is desirable to provide a circuit for electrically heating the coil to be tested by a predetermined amount. A circuit is therefore provided for so heating the coil to be tested. That is, the primary winding 110 of a transformer 112 is connected directly to the terminal 74, and to the terminal 72 through a switch 114, which switch is provided with means 116 for opening the switch after it has been closed for a predetermined time interval. The transformer 112 has a core 118 and a secondary winding 120 that is magnetically coupled to the primary winding 110 through the core 118. The secondary winding 120 is connected to terminals or binding posts 122 and 124. The switch 114 has a contact carrying arm 126, upon which is mounted a contact 128 in alignment for engagement with a cooperating stationary contact 130. The contact carrying arm 126 is moved to effect engagement of the contacts 128 and 130 by movement of a manually operable member 132. That is, the contact carrying arm 126 has projecting fingers 134 and 136 thereon that are in alignment for engagement with a cam 138 that is mounted on, and rotatable with a shaft 140. Whether the cam 138 engages the finger 134 or the finger 136 depends upon the direction of movement of the cam 138. The shaft 140 is connected to the manually operable member 132 through a spring escapement mechanism indicated diagrammatically at 142. The closing of the contacts 128 and 130 by operating the manually operable member 132 winds up a spring in the escapement mechanism, the recoil of which spring is time controlled and effects disengagement of the contacts 128 and 130.

A panel on which the manually operable control members 26, 98, and 132 are mounted, is indicated at 144.

Figure 2:
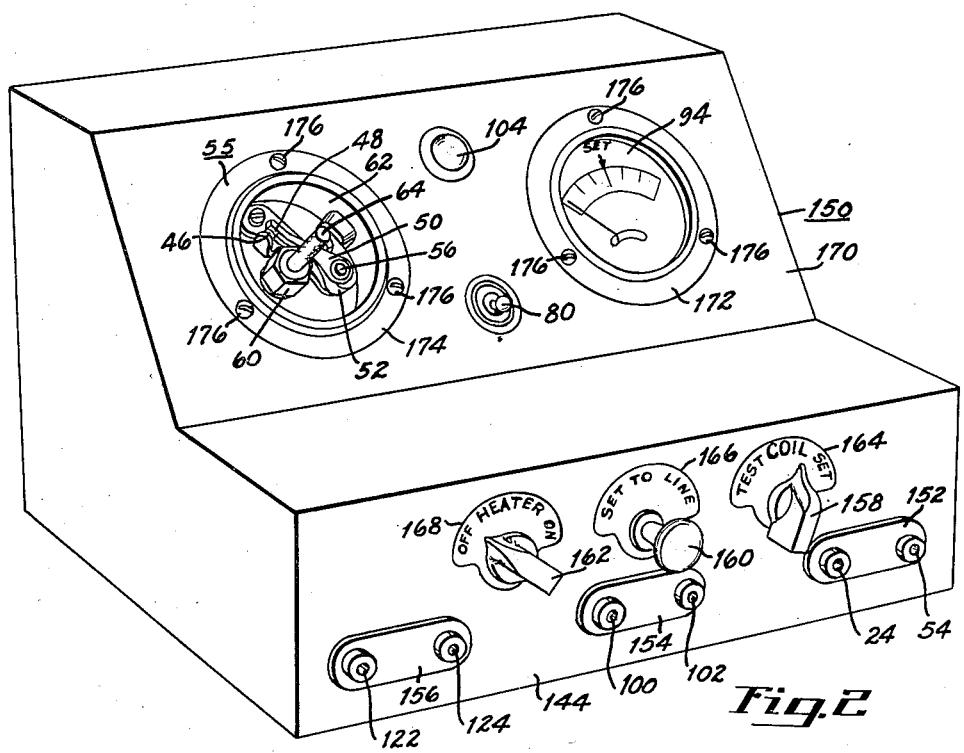
Fig. 2 is a perspective view of a unitary structure embodying a preferred form of the present invention.

With particular reference to Fig. 2, a unitary structure is there shown which embodies the circuit and apparatus disclosed in Fig. 1; and reference numerals similar to those previously used in describing the structure and circuit of Fig. 1 refer to similar parts in Fig. 2. In this unitary structure, a housing 150 preferably encloses the apparatus, except for the direct current supply or battery 10 which is placed outside of the housing and connected to suitable binding posts, not shown. The panel 144 comprises a part of the housing 150. On this panel 144 the terminals or binding post 24 and 54, 100 and 102, and 122 and 124, which are preferably jack type terminals into which connecting wires or plugs may be inserted, are insulatingly mounted on insulating blocks 152, 154 and 156 respectively. Projecting from the panel 144, control knobs 158, 160 and 162 are provided for manually operating the manually operable members 26, 98 and 132 respectively; and cooperating with the control knobs are indicator plates 164, 166 and 168 respectively which designate the purpose and positions of the knobs. The indicating devices 94 and 104, the switch 80 and the circuit breaker are preferably mounted on a separate panel 170 of the housing 150. The housing of the indicating device 94 and the housing 62 of the circuit breaker 55 are preferably provided with flanges 172 and 174 respectively, which are secured to the panel 170 by screws 176, or other suitable fastening means.

In Figs. 3, 4, and 5, parts of the circuit shown in Fig. 1 that are utilized for making different tests on a coil are separated to clarify and simplify the explanations thereof. In these figures also, reference numerals similar to those previously used refer to similar parts.

In the operation of the device, the testing of a coil or transforming device includes several steps. That is, (1) the testing of the coil for continuity of the windings either before or after the coil is heated, or both; (2) the testing of the coil for grounds, short circuited turns and other losses either before or after heating, or both; and (3) the heating of the coil.

*Continuity test.*—The circuit for testing the continuity of a coil winding is included in the circuit shown in Fig. 1, but is separately shown in Fig. 3. In making this continuity test, preferably alternating current is supplied to the terminals 72 and 74. The coil, the continuity of which is to be tested, is connected across the terminals 100 and 102. If the coil is continuous, and has no breaks in the winding, the indicating device or gaseous discharge tube 104 will provide an indication due to the current flow therethrough.

*Test for short circuited turns and other losses.*—The circuit for testing a coil for short circuited turns is included in that shown in Fig. 1, and is separately shown in Fig. 4. In making the test for short circuited turns, the circuit breaker is started by closing the switch 80 which closes the circuit to the circuit breaker driving motor 66. The switch 14 is then operated to effect engagement of the contacts 18 and 30 to close the circuit to the primary winding 36 of the standard coil 38. Each time the contacts 46 and 48 of the circuit breaker are closed, the primary winding 36 is energized from the battery 10 through those circuit breaker contacts. This energization of the primary winding 36 builds up a flux in and around the primary winding 36, core 40 and secondary winding 34. The closing of the circuit breaker contacts 46 and 48 also short circuits the primary winding 84 of the transformer 86 through the resistor 88. However, when the circuit breaker contacts 46 and 48 break, the flux in the standard coil 38 collapses, and in collapsing, creates a potential across the winding 36 and condenser 82 which potential controls the current flow through the primary winding 84 of the transformer 86 while the circuit breaker contacts are open. The average value or magnitude of the potential across the primary winding 36 is necessarily dependent upon the rate of damping of the flux or oscillations through that winding. The fact that the condenser is connected across the winding makes the circuit oscillatory. The oscillatory current in the oscillatory circuit consequently effects an indication on the indicating device 94, the value of which indication is controlled by setting the core 96 of the transformer 86 and thereby regulating the magnetic coupling between the windings 84 and 90 of that transformer. The core 96 is preferably so set that a predetermined indicated value, such as at the line marked "set" on the indicator dial shown in Fig. 2, is indicated by the indicating device 94.

After this setting operation, and without changing the setting of the core 96, the speed of the motor 66 or the potential of the battery 10, the switch 14 is operated to effect engagement of the contacts 16 and 20. The primary winding of the coil to be tested being now connected across the terminals 24 and 54, that coil is connected into the circuit. The secondary winding of the coil of the transforming device to be tested is preferably left open. Since the value of the indication provided by the indicating device 94 is dependent upon the alternating or oscillating current in the oscillatory circuit and the rate of damping of that current, the indicating device 94 will provide an indication dependent upon the coil to be tested, because the losses in the coil directly effect rate of damping of the current oscillations. Also, since short circuited turns in either of the magnetically coupled primary or secondary windings or other losses in the coil to be tested tend to cause quicker damping of the oscillations in the coil, the indication provided by the indicating device 94 will be decreased to a value below the normal or proper value for the coil by such short circuited turns, because of the decrease of the average current effected by the more rapid damping. Knowing the proper or normal indicated value for a coil or transforming device having certain characteristics, this circuit and apparatus consequently provides a definite indication as to whether there are any short circuited turns in either winding, or, in other words, whether there are any abnormal electrical losses in the coil, or transforming device.

*Heater circuit.*—In order to determine whether the performance characteristic of a coil or transforming device are satisfactory when the coil is heated, as well as when it is cold, it is desirable to test the coil after it has been heated. The most convenient way to heat the coil internally is to apply a current, and preferably an alternating current thereto. However, to insure the heating of the coil by a predetermined amount and to prevent excessive heating, the current should be applied thereto for only a predetermined time interval. In the present system, the coil or transforming device to be heated is connected across the terminals 122 and 124. The circuit thereto is then closed through the transformer 112 by operating the time control switch 114 which automatically opens the circuit after a predetermined time interval. The transformer 112 is provided to limit or control the voltage that is applied to the winding of the coil.

From the foregoing description of the construction and mode of operation of the present apparatus for testing electrical coils, it will be clearly understood that the apparatus includes a source of direct current 10, a coil 112 to be tested, a circuit interrupter 55 for periodically connecting the said coil 112 to the direct current source 10, means 82 connected to the coil 112 for effecting a damped oscillatory decay of the flux of the coil during interruptions of the circuit interrupter 55, and means 94 connected to the direct current circuit to the coil 112 for measuring an electrical quantity dependent upon the rate of damping of flux oscillations in the coil 112.

While the embodiment of the present invention as herein disclosed, constitutes a preferred form, it is to be understood that other forms might be adopted, all coming within the scope of the claims which follow.

What is claimed is as follows:

1. The method of testing a coil, comprising the steps of intermittently applying a direct current to the coil so that flux is intermittently built up around the turns of the coil, and obtaining an indication of the condition of the coil by measuring an electrical quantity that is dependent upon the rate of damping of flux oscillations through the turns of the coil when no direct current is being applied to the coil.

2. The method of testing a coil, comprising the steps of intermittently applying a direct current to a standard coil at a substantially constant rate so that flux is intermittently built up around the turns of the standard coil, quantitatively measuring a value dependent upon the rate of damping of an oscillatory current in the standard coil, substituting the coil to be tested for the standard coil so that the direct current is intermittently applied thereto at substantially the same rate, and quantitatively measuring an electrical value dependent upon the rate of damping of an oscillatory current in the coil being tested.

3. The method of testing a coil, comprising the steps of intermittently applying a direct current of constant potential to the coil at a substantially constant rate so that flux is intermittently built up around the turns of the coil, measuring an electrical quantity that is dependent upon the rate of decrease in amplitude of flux oscillations of the coil, heating the coil by applying an alternating current thereto, and again intermittently applying the direct current thereto while the coil is heated and making a measurement similar to that previously made.

4. In apparatus for testing electrical coils, the combination comprehending a source of direct current, a coil to be tested, a circuit interrupter for periodically connecting the said coil to the direct current source, means connected to the coil for effecting a damped oscillatory decay of the flux of the coil during interruptions of the circuit interrupter, and means connected to the direct current circuit to the coil for measuring an electrical quantity dependent upon the rate of damping of flux oscillations in the coil.

5. In apparatus for testing electrical coils, the combination comprehending a coil to be tested, means for heating the coil a predetermined amount, a source of direct current, a circuit interrupter for periodically connecting the coil to the direct current source, means effecting an oscillatory collapse of the flux in the coil when the circuit interrupter is open, and means connected to the coil for measuring an electrical quantity dependent upon the average value of the oscillatory current of the coil during the circuit interruptions effected by the circuit interrupter.

6. In apparatus for testing electrical coils, the combination comprehending a coil to be tested, a source of current providing a testing potential, a standard coil, indicating means, means including a transformer selectively connecting the indicating means to the standard coil and the coil to be tested, said transformer having an adjustable core for setting the indication of the indicating means to a predetermined indicated value when said indicating means is connected to the standard coil, said indicating means then providing a quantitative indication of the condition of the coil to be tested when connected thereto.

7. In apparatus for testing electrical transforming devices having primary and secondary windings, the combination comprehending a source of direct current adapted to be connected to one of the windings of the transforming device, the other of said windings being open circuited, a condenser, a periodic circuit interrupter for periodically interrupting the current flow from the source to the transforming device and effectively connecting the condenser to the transforming device so that flux periodically builds up and oscillatingly decays in said transforming device, and an indicating device electrically connected to the transforming device and adapted to provide a quantitative indication, said indicating device being so connected that electrical losses in the transforming device decrease the quantitative indication of the indicating device.

RALPH E. STURM.
HERMAN L. HARTZELL.